April 23, 1957  G. VERIK  2,789,831
TRICYCLE VEHICLES FOR CHILDREN
Filed June 1, 1953  5 Sheets-Sheet 3
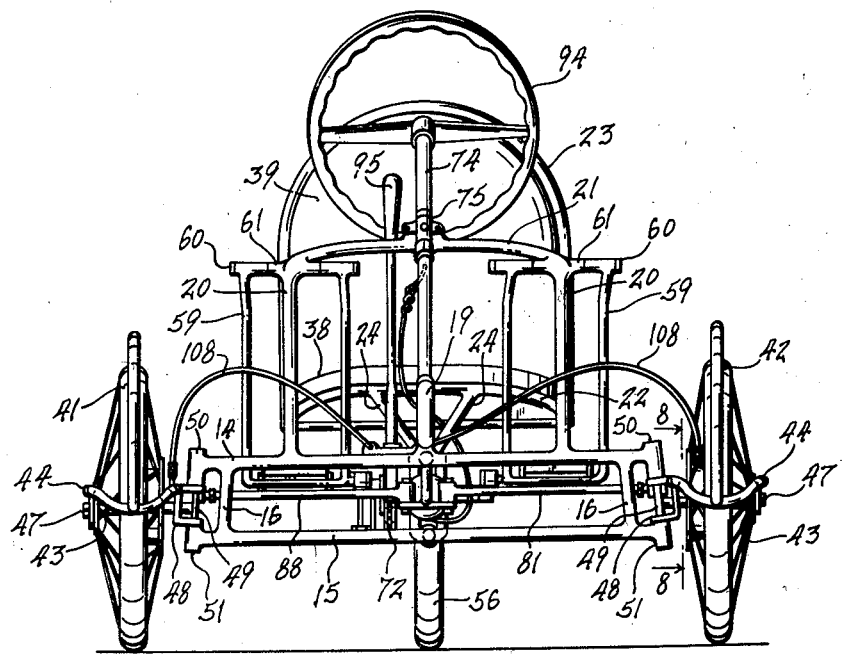
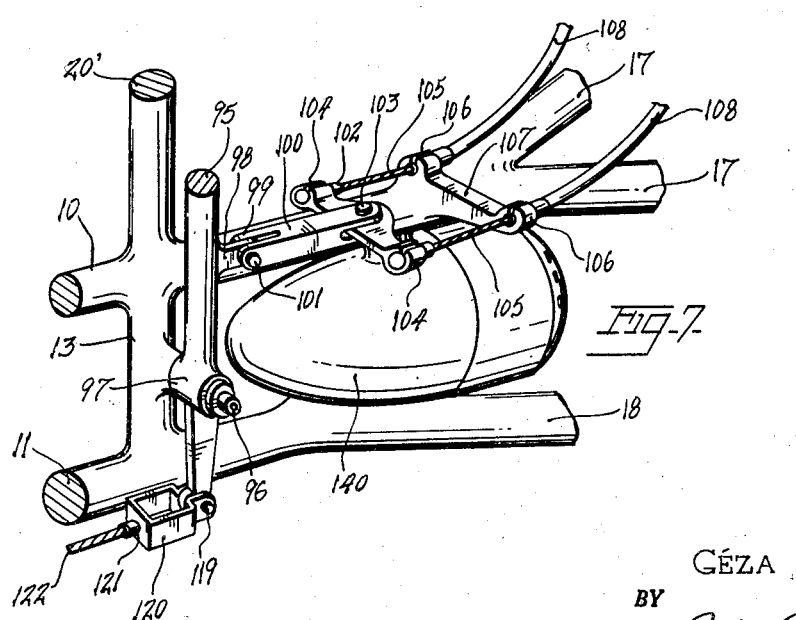
INVENTOR.
GÉZA VERIK
BY
ATTORNEY

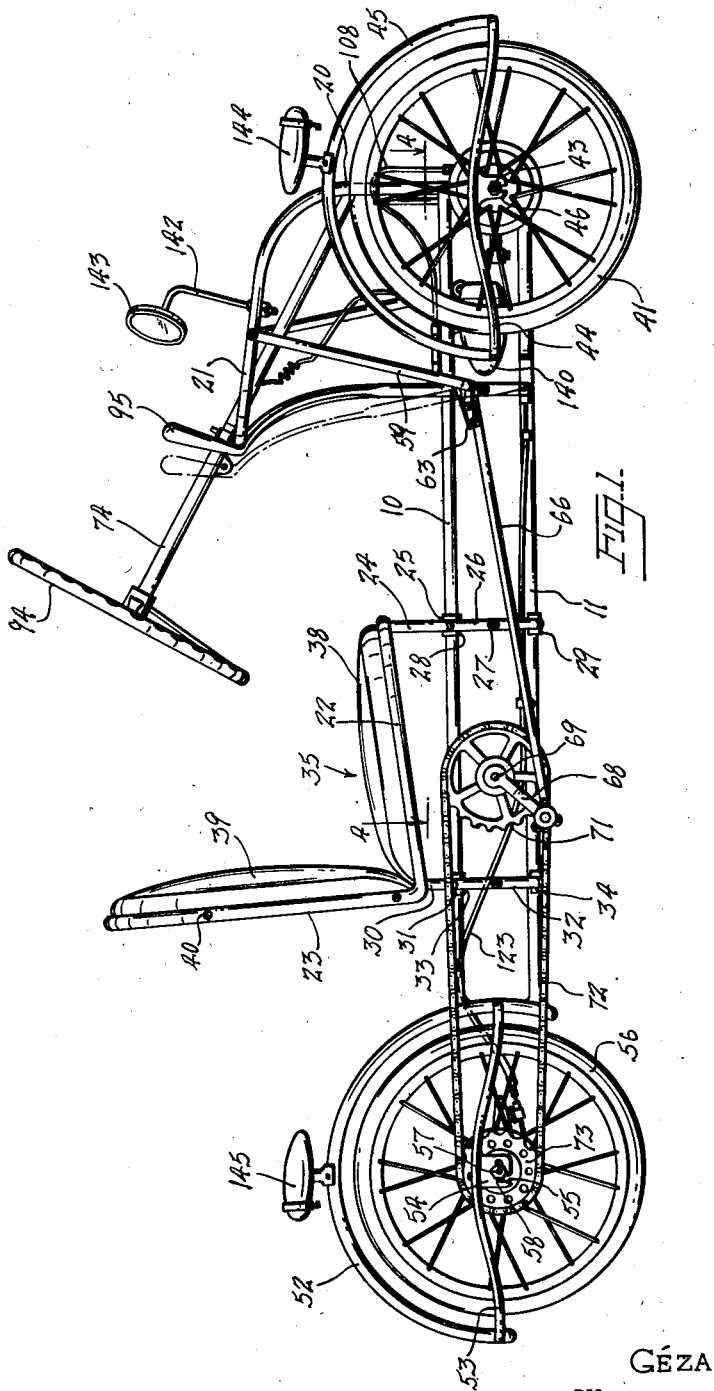

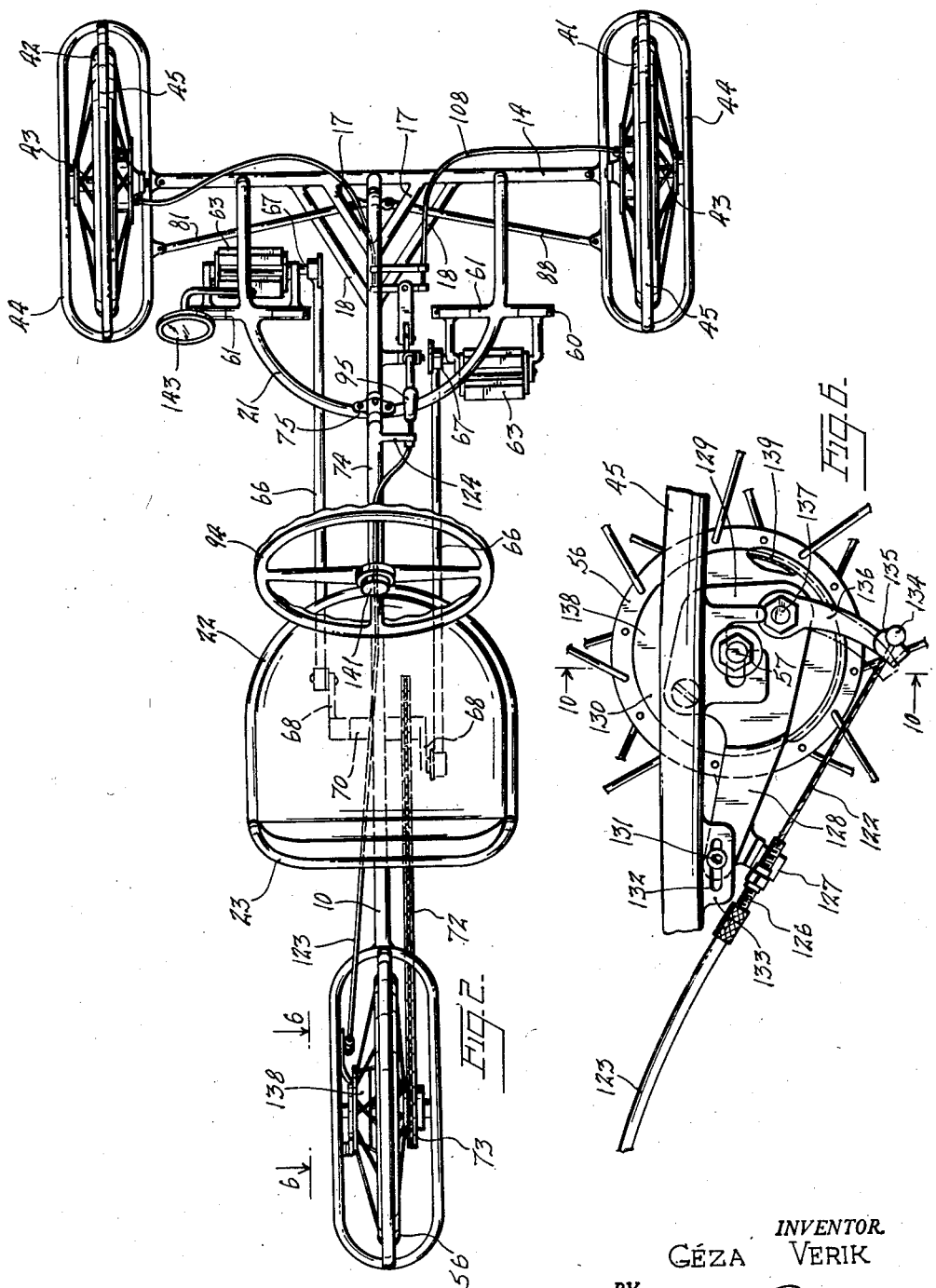

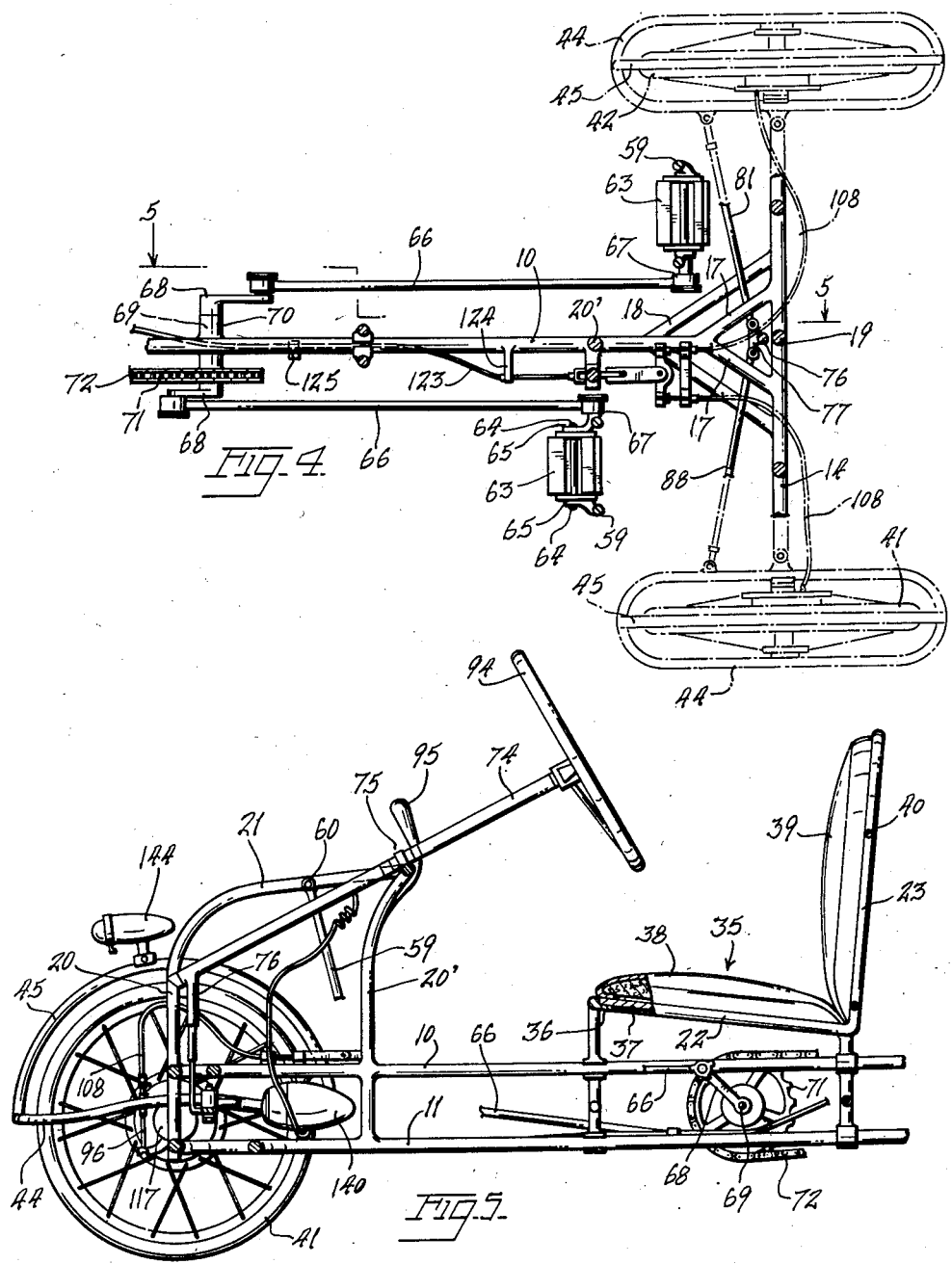

April 23, 1957  G. VERIK  2,789,831
TRICYCLE VEHICLES FOR CHILDREN
Filed June 1, 1953  5 Sheets-Sheet 5
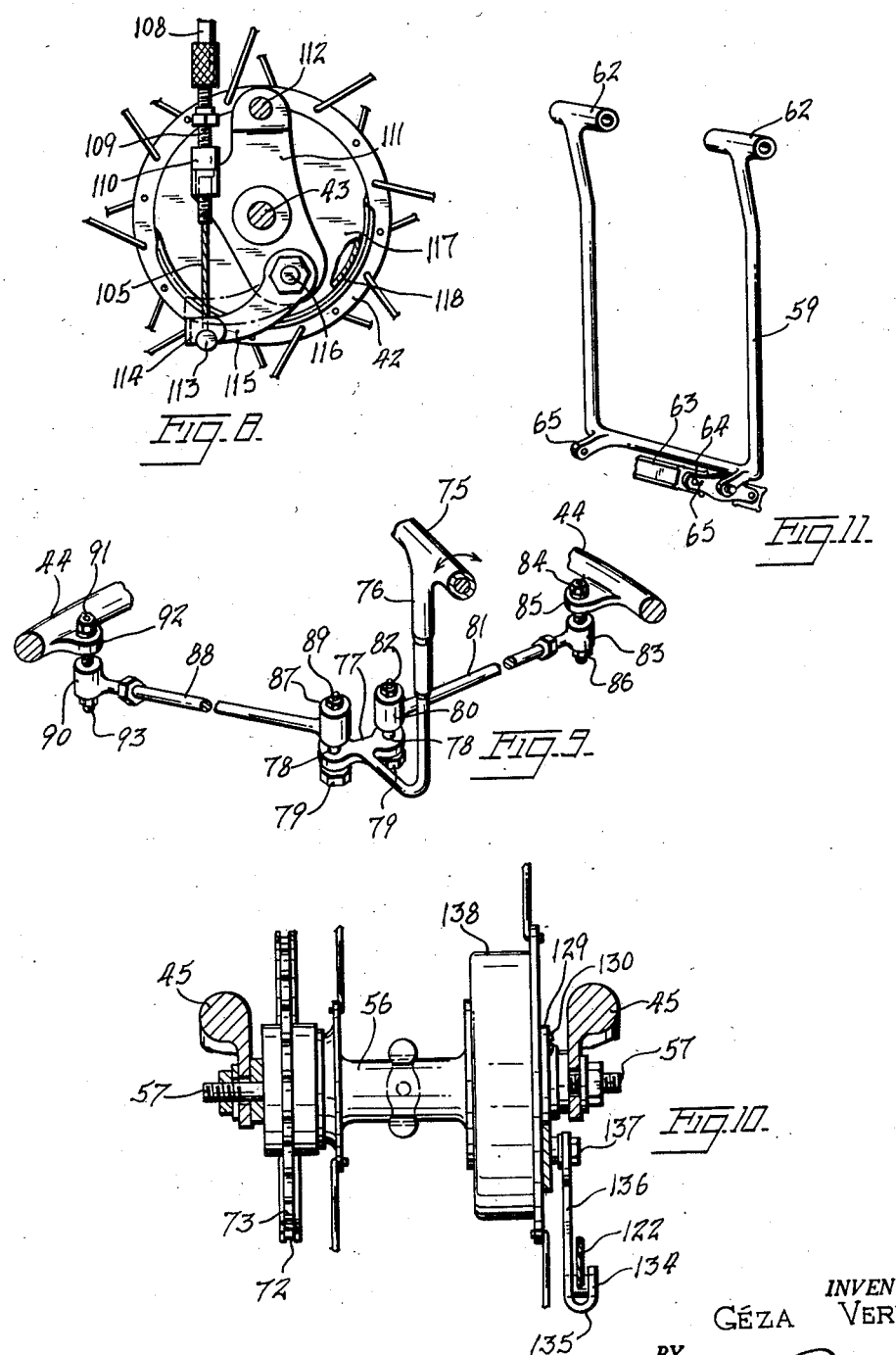
INVENTOR.
GÉZA VERIK
ATTORNEY

United States Patent Office 2,789,831
Patented Apr. 23, 1957

2,789,831

TRICYCLE VEHICLES FOR CHILDREN

Géza Verik, College Point, N. Y.

Application June 1, 1953, Serial No. 358,825

7 Claims. (Cl. 280—257)

This invention relates to manually propelled tricycle vehicles for children.

A principal object of the present invention is to provide a tricycle vehicle which is easily operated, sturdy and pleasing in appearance.

Another object of the invention is to provide a vehicle of this kind with a unitary frame for supporting the various mechanisms.

A further object of the invention is to provide a tricycle vehicle with improved driving mechanism.

Yet another object of the invention is to provide a vehicle of this kind with a sturdy and well balanced seat structure.

It is further proposed to provide a tricycle vehicle which is simple in construction and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a tricycle vehicle embodying my invention.

Fig. 2 is a top plan view thereof, parts being omitted.

Fig. 3 is a front elevational view thereof.

Fig. 4 is a horizontal sectional view taken on the plane of the line 4—4 of Fig. 1, parts being shown in dot-dash lines and parts being broken away.

Fig. 5 is a sectional view taken on the plane of the line 5—5 of Fig. 4.

Fig. 6 is an enlarged sectional view taken on the plane of the line 6—6 of Fig. 2.

Fig. 7 is an enlarged fragmentary perspective detail view of the actuating means for the braking mechanism.

Fig. 8 is an enlarged vertical sectional view taken on the plane of the line 8—8 of Fig. 3, parts being broken away.

Fig. 9 is an enlarged fragmentary perspective view of the steering mechanism.

Fig. 10 is a vertical sectional view taken on the plane of the line 10—10 of Fig. 6.

Fig. 11 is an enlarged perspective detail view of an actuating frame for the driving mechanism, parts being broken away.

Referring in detail to the drawings, the practical embodiment of the tricycle vehicle shown herein comprises a unitary chassis or main frame composed of round bars and including elongated central upper and lower, horizontally disposed, bars 10 and 11, respectively, extending from the front to a point near the rear of the vehicle. The bars 10 and 11 are connected and rigidly spaced from each other by vertical bars 13. Upper and lower horizontally disposed bars 14 and 15, respectively, extend across the front of the vehicle and are connected to and rigidly spaced from each other by vertical bars 16. The upper central bar 10 is integrally connected to the upper front bar 14 at spaced points therealong by inclined bars 17, and the lower front bar 15 by inclined bars 18. An upright bar or post 19 is integrally formed on the upper bar 14 at its center.

An auxiliary frame is integrally formed with the front upper bar 14 of the main frame and consists of a round bar having vertically disposed spaced leg portions 20 and a horizontally disposed inverted substantially U-shaped portion 21 extending rearwardly from the top of the leg portions and braced and connected to the upper longitudinally extending bar 10 by an upright bar 20'.

A seat structure is mounted on the main frame midway its ends and includes a frame composed of a round bar having a substantially U-shaped horizontally disposed portion 22 and an integrally formed inverted substantially U-shaped vertically disposed portion 23. The front of the horizontally disposed portion 22 is supported by opposed slanting bars 24 having semi-tubular bearings 25 encircling the upper central bar 10 of the main frame. A pair of vertically disposed bars 26 braced by a connecting bar 27 and having upper and lower semi-tubular bearings 28 and 29, respectively, encircling the bars of the main frame underneath the bars 24, reinforce the main frame at the front of the seat frame. The rear of the seat frame is supported by opposed slanting bars 30 formed integrally with the frame portion 22, and provided with semi-tubular bearings 31 encircling the upper central bar 10 of the main frame. The bars 29 are shorter than the bars 24 at the front of the seat frame so that the rear of the seat frame is lower than the front thereof. A pair of vertically disposed bars 32 having upper and lower semi-tubular bearings 33 and 34, respectively, encircling the main bars of the frame, reinforce the main frame at the rear of the seat frame. A seat 35 is removably mounted on a flange 36 formed on the inner periphery of the horizontal portion 22 of the seat frame, said seat including a rigid base 37 seated on the flange 36 and a cushion pad 38 suitably fastened to the base. A back cushion pad 39 is secured to the vertically disposed portion 23 of the frame by screws 40.

The mounting of the front road wheels 41 and 42 is similar and each wheel is rotatably mounted on an axle 43 which extends on both sides of the wheel. A horizontally disposed endless bar 44, substantially elliptical in plan, encircles each wheel just above its axle 43, the ends of the bar 44 being connected by a longitudinally curved or semicircular bar 45 which encircles the upper half of the periphery of the wheel. The outer end of each axle 43 extends through a slotted lug 46 which is formed integrally with the outer side of the bar 44 and which is clamped on the axle by a nut 47. The inner side of each bar 44 is connected to a steering knuckle 48 supported for swinging steering movement on a pin 49 supported between opposed socket bearings 50 and 51 formed on the ends of the upper and lower front bars 14 and 15, respectively.

An auxiliary frame is formed integrally with the rear of the main frame, forming an extension thereof. The auxiliary frame consists of a longitudinally curved or semicircular vertically disposed round bar 52 formed integrally with the rear ends of the upper and lower longitudinally extending bars 10 and 11, respectively, of the main frame and forming an extension thereof. An endless bar 53, substantially elliptical in plan, disposed in a horizontal plane, connects the ends of the bar 52. A plate member 54 is formed integrally with the endless bar 53 at its center at each side thereof and depends downwardly therefrom. Each plate member is formed with a bayonet slot 55. A rear driving wheel 56 is rotatably mounted on an axle 57 which extends on both sides of the wheel and through the bayonet slots 55 in the plate members. Nuts 58 on the outer ends of the axle hold the axle on the auxiliary frame.

The mechanism for propelling the vehicle comprises a pair of U-shaped frames 59 pivotally suspended from pivot pins 60 extending through tubular bearings 61 secured to and extending across the side arms of the horizontally disposed auxiliary front frame portion 20 and through aligned tubular bearings 62 on the free ends of the U-shaped frames 59. Foot pedals 63 are rotatably mounted on shafts 64 supported by perforated lugs 65 on the cross piece of the U-shaped frames 59. Elongated rods 66 extending longitudinally of the main frame are connected at their outer ends to the lower ends of the U-shaped frames 59, as indicated at 67, and are connected at their inner ends to cranks 68 secured to the ends of a crank-shaft 69 rotatably mounted in a tubular bearing 70 supported by the main frame. The cranks are spaced 180° apart from each other. A sprocket wheel 71 is fastened to one end of the shaft 69. An endless sprocket chain 72 is mounted on the sprocket wheel 71 and extends rearwardly and around a sprocket wheel 73 fastened to the rear axle 57.

It will be understood that the various road and sprocket wheels and the pedals or their shafts will usually be provided with conventional ball bearings.

In order to propel the vehicle, the child pushes on the foot pedals 63 which rock the frames 59. Rocking of the frames 59 reciprocates the rods 66 which rods rotate the sprocket wheel 71. Sprocket wheel 71 in turn moves the sprocket chain 72 which rotates the sprocket wheel 73 on the rear axle 57 for turning the rear wheel 56. The rear wheel drives the front road wheels 41 and 42.

The steering mechanism is simple and positive and includes a steering column 74 rotatably mounted on the center of the horizontally disposed portion 20 of the front auxiliary frame by means of a sectional bearing 75. The column is arranged at an angle to the vertical and extends from a point in front of the seat 35 forwardly to the front end of the main frame where it is journalled in the top end of the upright bar 19. At its outer lower end, the column is formed with an integral extension 76 extending downwardly at right angles thereto. Midway its ends, the extension is bent at right angles and projects rearwardly of the vehicle, terminating in a cross piece 77 having openings 78 in the ends thereof for receiving threaded bolts 79. One of the bolts 79 extends through a tubular bearing 80 on one end of a tie rod 81 and is secured thereto by a nut 82. The tie rod 81 extends toward the front road wheel 42 and has a tubular sleeve 83 on its other end secured to a bolt 84 passing through a perforated lug 85 on the inner periphery of the endless bar 44 encircling said wheel 42 and is secured thereto by a nut 86. The other bolt 79 extends through a tubular bearing 87 on one end of a tie rod 88 and is secured thereto by a nut 89. The tie rod 88 extends toward the front wheel 41 and has a tubular bearing 90 on its other end secured to a bolt 91 passing through a perforated lug 92 on the inner periphery of the endless bar 44 encircling the wheel 41 and is secured thereto by a nut 93. A hand wheel 94 is fastened to the upper end of the column 74 and when the wheel 94 is turned the endless bars 44 encircling the front wheels 41 and 42 are turned, in unison, causing said front wheels to execute similar steering movements.

The tricycle vehicle is provided with a mechanical braking system, shown in detail in Fig. 7, for simultaneously braking the front wheels 41 and 42 and the rear wheel 56. The braking system includes a vertically disposed braking lever 95 pivotally mounted on a pivot pin 96 extending laterally from one of the vertical bracing bars 13 adjacent the front of the vehicle. The pivot pin 96 is received in a tubular bearing portion 97 formed in the lever. An integral perforated lug 98 extends outwardly from the braking lever at a point above the pivot pin 96, in a direction forwardly of the vehicle. The outer end of the lug is pivotally connected to the vertically slotted inner end 99 of a bar 100 by means of a pin 101. The outer end of the bar 100 is horizontally slotted to receive a horizontally disposed plate member 102 secured therein by a pin 103. The ends of the plate member 102 are formed with split socket portions 104 for anchoring the ends of flexible cables 105. The cables pass through split sleeves 106 formed on a transversely disposed bracket 107 formed integrally with the upper longitudinally extending bar 10 of the main frame, and extend loosely through flexible tubes 108 forwardly of the vehicle to the front road wheels 41 and 42. The inner ends of the flexible tubes 108 are anchored in the sleeves 106 of the bracket 107 and their outer ends are connected to rigid, externally threaded tubes 109 supported in brackets 110 formed integrally on plates 111 secured to the hubs of the front wheels by screws 112 whereby the flexible tubes 108 may be adjusted longitudinally. The outer ends of the cables 105 are anchored to pins 113 secured to the bent-over ends 114 of braking levers 115, the other ends of the levers being connected to the outer ends of stub shafts 116 extending into the interior of brake drums 117 which are fastened to the axles 43 of the front wheels 41 and 42. The inner ends of the stub shafts are operatively connected to brake shoes 118 in the drums for braking the wheels.

A pivot pin 119 is carried on the bottom of the braking lever 95 and pivotally secured to said pin is a bearing member 120 which extends in a direction rearwardly of the vehicle and is formed with a socket opening 121 for anchoring the end of a cable 122. Cable 122 extends rearwardly of the vehicle through a flexible tube 123, the tube being guided and supported by a bracket 124 extending laterally from the lower longitudinally extending bar 11 of the main frame adjacent the front of the vehicle, and by a strap 125 on the lower bar 11 midway the ends of the vehicle. At its rear end, the tube 123 is connected to a rigid externally screw-threaded tube 126 threadedly supported in a bracket 127 formed on an extension 128 of a plate 129 pivotally fastened at one point to one side of the endless bar 45 by a screw 130, whereby the plate may be adjusted along the bar 45. It is held in adjusted position by a bolt 131 passing through an opening in the end of the extension 128 and through a slot 132 formed in a lug 133 formed integrally on the endless bar 45. The tube 126 provides means for adjusting the flexible tube 123 lengthwise. The rear end of the cable 122 passes through the rigid tube 126 and is fastened to a pin 134 secured to the bent-over end 135 of a braking lever 136, the other end of the lever being connected to the outer end of a stub shaft 137 extending into the interior of a brake drum 138 fastened to the rear axle 57. The inner end of the stub shaft 137 is operatively connected to brake shoes 139 in the drum for braking the rear wheel.

When the lever 95 is pulled rearwardly of the vehicle, as shown in Fig. 1, the cables 105 leading to the front wheels 41 and 42 are displaced rearwardly thereby operating the brake shoes in the drums 117 on the front axles 43, and simultaneously the cable 122 leading to the rear wheel 56 is pulled and displaced forwardly operating the brake shoes 139 in the drum 138 on the rear axle 57, whereby the front and rear wheels are effectively braked.

The novel frame construction of the tricycle affords ready means for mounting accessories, such as an electrically controlled horn 140 mounted on the underside of the upper longitudinally extending frame bar 10, at a point rearwardly of the front bars 14 and 15, and actuated by a button 141 on the top end of the steering column 74.

A bracket 142 for a rear view mirror 143 is readily and adjustably mounted on one side of the front auxiliary frame portion 20 at a point forwardly of the steering wheel 94.

The longitudinally curved bars 45 encircling the front wheels 41 and 42 afford convenient means for supporting ornamental lamps 144, and the curved bar 52 of the rear wheel affords similar mounting means for an ornamental lamp 145.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a tricycle vehicle, a main frame composed of spaced vertically aligned elongated bars extending longitudinally of the vehicle and of vertically aligned elongated bars extending transversely of the vehicle at the front thereof, an auxiliary frame on the upper bar of the front bars composed of spaced vertically disposed leg portions and an inverted substantially U-shaped portion extending rearwardly of the tops of the leg portions, an auxiliary frame formed integrally with the longitudinally extending bars of the main frame and forming a rearward extension thereof, front wheels connected to the front bars, a rear wheel connected to the rear auxiliary frame, U-shaped bars swingably connected on the U-shaped portion of the front auxiliary frame, pedals on said U-shaped bars, longitudinally movable rods operatively connected to said U-shaped bars, a sprocket wheel connected to said rods, and flexible means of connection between the sprocket wheel and the rear wheel for driving the latter.

2. In a tricycle vehicle, a main frame composed of spaced vertically aligned elongated bars extending longitudinally of the vehicle and of vertically aligned elongated bars extending transversely of the vehicle at the front thereof, an auxiliary frame on the upper bar of the front bars, an auxiliary frame formed integrally with the longitudinally extending bars of the main frame and forming a rearward extension thereof, said latter auxiliary frame being composed of a vertically disposed longitudinally curved bar connected to the rear ends of the longitudinally extending bars and of a horizontally disposed endless bar connected to the ends of said curved bar, front wheels connected to the front bars of the main frame, a rear wheel connected to the endless bar of the rear auxiliary frame, U-shaped bars swingably mounted on the front auxiliary frame, pedals on said U-shaped bars, longitudinally movable rods operatively connected to said U-shaped bars, a sprocket wheel connected to said rods, and flexible means of connection between the sprocket wheel and the rear wheel for driving the latter.

3. In a tricycle vehicle, a main frame composed of spaced vertically aligned elongated bars extending longitudinally of the vehicle and of vertically aligned elongated bars extending transversely of the vehicle at the front thereof, an auxiliary frame on the upper bar of the front bars composed of spaced vertically disposed leg portions and an inverted substantially U-shaped portion extending rearwardly of the tops of the leg portions, an auxiliary frame formed integrally with the longitudinally extending bars of the main frame and forming a rearward extension thereof, said latter auxiliary frame being composed of a vertically disposed longitudinally curved bar connected to the rear ends of the longitudinally extending bars and of a horizontally disposed endless bar, substantially elliptical in plan, connected to the ends of said curved bar, front wheels connected to the front bars of the main frame, a rear wheel connected to the endless bar of the rear auxiliary frame, U-shaped bars swingably mounted on the front auxiliary frame, pedals on said U-shaped bars, longitudinally movable rods operatively connected to said U-shaped bars, a sprocket wheel connected to said rods, and flexible means of connection between the sprocket wheel and the rear wheel for driving the latter.

4. In tricycle vehicle, a main frame composed of spaced vertically aligned elongated bars extending longitudinally of the vehicle and of vertically aligned elongated bars extending transversely of the vehicle at the front thereof, said bars being arranged in T-shape formation, an auxiliary frame on the upper bar of the front bars and being composed of spaced vertically disposed leg portions and an inverted substantially U-shaped portion extending rearwardly of the tops of the leg portions, an auxiliary frame formed integrally with the longitudinally extending bars of the main frame and forming a rearward extension thereof, said latter auxiliary frame being composed of a vertically disposed longitudinally curved bar connected to the rear ends of the longitudinally extending bars and of a horizontally disposed endless bar connected to the ends of said curved bar, front wheels connected to the front bars of the main frame, a rear wheel connected to the endless bar of the rear auxiliary frame, U-shaped bars swingably mounted on the front auxiliary frame, pedals on said U-shaped bars, longitudinally movable rods operatively connected to said U-shaped bars, a sprocket wheel connected to said rods, and a sprocket chain connected to said sprocket wheel and the rear wheel for driving the latter.

5. In a tricycle vehicle, a main frame composed of spaced vertically aligned elongated bars extending longitudinally of the vehicle and of vertically aligned elongated bars extending transversely of the vehicle at the front thereof, said bars being arranged in T-shaped formation, an auxiliary frame on the upper bar of the front bars, an auxiliary frame formed integrally with the longitudinally extending bars of the main frame and forming a rearward extension thereof, front wheels connected to the front bars, a rear wheel connected to the rear auxiliary frame, means for rotating said wheels, and a seat mounted on said main frame intermediate its ends, said seat including a frame having a substantially U-shaped horizontally disposed portion and an integral, inverted substantially U-shaped vertically disposed portion, slanting bars connecting said horizontally disposed portion with the upper longitudinally extending bar, a seat member on said horizontally disposed portion, and a back cushion on said vertically disposed portion.

6. In a tricycle vehicle, a chassis assembly comprising elongated bars spaced one above the other and extending longitudinally of the vehicle, bars interposed in the space between said longitudinally extending bars, bars spaced one above the other and extending transversely of the vehicle, inverted V-shaped integral bars connecting the longitudinally extending bars and the transverse bars, an auxiliary frame supported on the upper transverse bar composed of a bar having spaced leg portions connected to said upper transverse bar and an inverted substantially U-shaped portion extending at right angles to the leg portions rearwardly of the vehicle, and an auxiliary frame supported on the rear ends of said longitudinally extending bars and an endless bar, substantially elliptical in plan, connecting the ends of said longitudinally curved bar.

7. In a tricycle vehicle, a chassis assembly comprising elongated bars spaced one above the other and extending longitudinally of the vehicle, bars interposed in the space between said longitudinally extending bars, bars spaced one above the other and extending transversely of the vehicle at the front thereof, inverted V-shaped integral bars connecting the longitudinally extending bars and the transverse bars, an auxiliary frame supported on the upper transverse bar composed of a bar having spaced straight leg portions connected to said upper transverse bar and an inverted substantially U-shaped portion extending at right angles to the leg portions rearwardly of the vehicle, a semi-circular auxiliary frame supported on the rear ends of said longitudinally extending bars including a longitudinally curved bar and an endless bar, substantially elliptical in plan, connecting the ends of said longitudinally curved bar, and a front wheel assembly comprising a longitudinally curved bar, an endless bar, substantially elliptical in plan, connecting the ends of said latter curved bar, an axle supported across said latter endless bar, a wheel rotatably mounted on said axle within said latter endless bar, and means on said latter endless bar for connecting said latter endless bar to an elongated bar.

References Cited in the file of this patent

UNITED STATES PATENTS

| | | |
|---|---|---|
| D. 150,817 | Taylor | Aug. 31, 1948 |
| 588,361 | Shurz | Aug. 17, 1897 |
| 616,421 | Manson | Dec. 20, 1898 |
| 662,030 | Sauerhering | Nov. 20, 1900 |
| 1,585,832 | Doud | May 25, 1926 |
| 1,694,183 | Kraeft | Dec. 4, 1928 |
| 1,743,642 | Wahlberg | Jan. 14, 1930 |
| 1,847,914 | Ashton | Mar. 1, 1932 |
| 2,334,702 | Newton et al. | Nov. 23, 1943 |
| 2,429,302 | Abbe | Oct. 21, 1947 |
| 2,481,683 | Polacek | Sept. 13, 1949 |